US012735126B2

(12) United States Patent
Herrmann et al.

(10) Patent No.: US 12,735,126 B2
(45) Date of Patent: Sep. 15, 2026

(54) AIR-GUIDING ELEMENT AND MOTOR VEHICLE COMPRISING AN AIR-GUIDING ELEMENT

(71) Applicant: Dr. Ing. h.c. F. Porsche Aktiengesellschaft, Stuttgart (DE)

(72) Inventors: Bernd Herrmann, Ehningen (DE); Joachim Paul, Benningen a.N. (DE); Okan Gönüldinc, Ostfildern (DE); Moritz Zeh, Stuttgart (DE); Dominik Beierl, Korntal-Münchingen (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 277 days.

(21) Appl. No.: 18/630,362

(22) Filed: Apr. 9, 2024

(65) Prior Publication Data

US 2024/0343322 A1 Oct. 17, 2024

(30) Foreign Application Priority Data

Apr. 17, 2023 (DE) ..................... 10 2023 109 535.8

(51) Int. Cl.
*B62D 35/00* (2006.01)

(52) U.S. Cl.
CPC .......... *B62D 35/008* (2013.01); *B62D 35/007* (2013.01)

(58) Field of Classification Search
CPC ..... B62D 35/007; B62D 35/008; B62D 37/02
USPC ........................................... 296/180.1, 180.5
See application file for complete search history.

(56) References Cited

U.S. PATENT DOCUMENTS

| | | | | |
|---|---|---|---|---|
| 9,327,775 B1 * | 5/2016 | Guenzel | ............... | B62D 35/008 |
| 2016/0159412 A1 * | 6/2016 | Oxley | .................. | B62D 35/007 296/180.5 |
| 2016/0318560 A1 * | 11/2016 | Kishima | .............. | B60Q 1/0035 |
| 2019/0382063 A1 * | 12/2019 | McAfee | ................. | B60J 10/767 |
| 2020/0114986 A1 * | 4/2020 | Eulalie | ................. | B62D 35/007 |
| 2023/0001991 A1 * | 1/2023 | Beierl | .................... | B62D 37/02 |
| 2023/0016708 A1 * | 1/2023 | Beierl | .................... | B62D 37/02 |
| 2023/0057190 A1 * | 2/2023 | Paul | ..................... | B62D 35/007 |
| 2023/0069094 A1 * | 3/2023 | Moradnia | ............ | B62D 35/007 |
| 2023/0415823 A1 * | 12/2023 | Beierl | .................... | B62D 25/24 |
| 2024/0343314 A1 * | 10/2024 | Herrmann | .............. | B62D 35/00 |

(Continued)

FOREIGN PATENT DOCUMENTS

| | | |
|---|---|---|
| DE | 102015121030 A1 | 6/2016 |
| DE | 102015121785 A1 | 6/2016 |

OTHER PUBLICATIONS

Search Report dated Oct. 30, 2023, by the German Patent Office for Application No. 10 2023 109 535.8, with machine translation. (10 pages).

*Primary Examiner* — Gregory A Blankenship
(74) *Attorney, Agent, or Firm* — Buchanan Ingersoll & Rooney PC

(57) ABSTRACT

An air-guiding element includes a surface element and a longitudinally displaceable carrier element. The surface element is articulated on the carrier element in a movably mounted manner. The air-guiding element further includes a drive element with a spindle mechanism and a linear guide. The carrier element can be driven in a longitudinally displaceable manner by the spindle mechanism such that a threaded spindle of the spindle mechanism is drivably connected to the drive element and a spindle nut is in driving connection with the carrier element.

9 Claims, 3 Drawing Sheets

(56) References Cited

U.S. PATENT DOCUMENTS

2024/0343316 A1* 10/2024 Bruin .................. B62D 35/001
2024/0343318 A1* 10/2024 Herrmann .............. B62D 37/02
2024/0343319 A1* 10/2024 Beierl .................. B62D 35/007
2024/0343320 A1* 10/2024 Beierl ....................... F16C 1/10
2024/0343321 A1* 10/2024 Beierl .................... B62D 37/02
2024/0343322 A1* 10/2024 Herrmann .............. B62D 37/02
2024/0351644 A1* 10/2024 Onishi ................. B62D 35/007
2024/0375580 A1* 11/2024 Lee .......................... B60Q 1/30
2024/0391539 A1* 11/2024 Lee ........................ B62D 37/02
2025/0042485 A1* 2/2025 Beierl .................. B62D 35/007
2025/0100633 A1* 3/2025 Lee ........................ B62D 37/02

* cited by examiner

AIR-GUIDING ELEMENT AND MOTOR VEHICLE COMPRISING AN AIR-GUIDING ELEMENT

CROSS-REFERENCE TO RELATED APPLICATION

This application claims priority to German Patent Application No. 10 2023 109 535.8, filed Apr. 17, 2023, the content of such application being incorporated by reference herein in its entirety.

FIELD OF THE INVENTION

The invention relates to an air-guiding element and a motor vehicle comprising an air-guiding element.

BACKGROUND OF THE INVENTION

In motor vehicles, it is known that an air flow flows around the motor vehicle from front to rear as the motor vehicle is traveling in forward direction. This air flow leads to a lateral flow around the motor vehicle and a flow around the rear of the motor vehicle. At the rear, a so-called wake of the flow around the vehicle occurs, i.e., an outflow, which increases the air resistance of the motor vehicle.

To affect the lateral flow around the motor vehicle at the vehicle rear, DE 10 2015 121 785 A1, which is incorporated by reference herein, made known air-guiding elements which are configured laterally on the vehicle rear such that they can be deployed in a linearly displaceable manner, so that they project laterally and lengthen the vehicle rear to affect the air flow in order to reduce air resistance. The air-guiding elements are thus deployed from the vehicle rear in the deployment direction and accordingly placed in the air flow. This limits the effect on the air flow to the positioning of the air-guiding element as it results from the linear deployment movement, which means an undesirable restriction of the reduction in air resistance.

SUMMARY OF THE INVENTION

Described herein is an air-guiding element and a motor vehicle comprising an air-guiding element that enables improved reduction of air resistance resulting from a lateral flow.

One embodiment example of the invention relates to an air-guiding element comprising a surface element and a longitudinally displaceable carrier element, wherein the surface element is articulated on the carrier element in a movably mounted manner, further comprising a drive element with a spindle mechanism and with a linear guide, wherein the carrier element can be driven in a longitudinally displaceable manner by means of the spindle mechanism such that a threaded spindle of the spindle mechanism is drivably connected to the drive element and a spindle nut is in driving connection with the carrier element. The carrier element can thus be safely and reliably displaceably disposed in a small installation space, wherein the surface element can be moved with the carrier element and can be moved into the air flow as needed.

It is particularly advantageous if the carrier element is mounted in a longitudinally displaceable manner in a side part or rear part of a motor vehicle, in particular a motor vehicle rear. This makes it possible to affect the flow around the motor vehicle at the rear by disposing the air-guiding element adjustably laterally on the vehicle rear; in particular by disposing two such air-guiding elements laterally on the vehicle rear.

It is also expedient if the surface element is disposed such that it can be moved through an opening of the side part or the rear part. This protects the inner region of the vehicle rear against dirt and water, etc. and the air-guiding element can still be disposed such that it can be deployed to affect the flow, while the carrier element and the drive element can be disposed such that they are protected.

It is also advantageous in one embodiment example if the linear guide of the drive comprises a guide carriage relative to which the carrier element can be displaced. This makes it possible to create a guide with a very slim and lightweight design that enables reliable deployability of the surface element.

It is also advantageous if the guide carriage comprises two guide sleeves which are disposed spaced apart from one another and in which guide pins of the carrier element engage in a displaceable manner. This enables stable guidance, which is not twisted even when there is a strong slipstream or wind effect on the surface element, so that stable positioning of the surface element is achieved at all times.

It is also particularly advantageous if the drive element is directly connected to the threaded spindle, in particular on the end face, so that the drive element directly drives the threaded spindle. This achieves an installation space-saving, direct and uncomplicated design without the interposition of another gearing.

One embodiment example of the invention relates to a motor vehicle comprising at least one air-guiding element, in particular comprising two air-guiding elements, according to aspects of the invention.

It is also expedient if the air-guiding elements are disposed in the rear region of the motor vehicle on a side part or rear part on two oppositely disposed sides. The flow around the rear region can thus be affected on both sides of the motor vehicle in order to improve the air resistance.

It is particularly advantageous if the at least one air-guiding element is longitudinally displaceable along a straight, angled, curved or arcuate path. This enables the available installation space to be well utilized for the positioning and displacement of the carrier element and the surface element.

It is also expedient if the carrier element and the drive element with the spindle mechanism are disposed in the side part or in the rear part and the surface element can be moved through an opening of the side part or the rear part.

BRIEF DESCRIPTION OF THE DRAWINGS

The invention is described in detail in the following on the basis of an embodiment example with reference to the drawings. The drawings show.

DETAILED DESCRIPTION OF THE INVENTION

Figure 1:
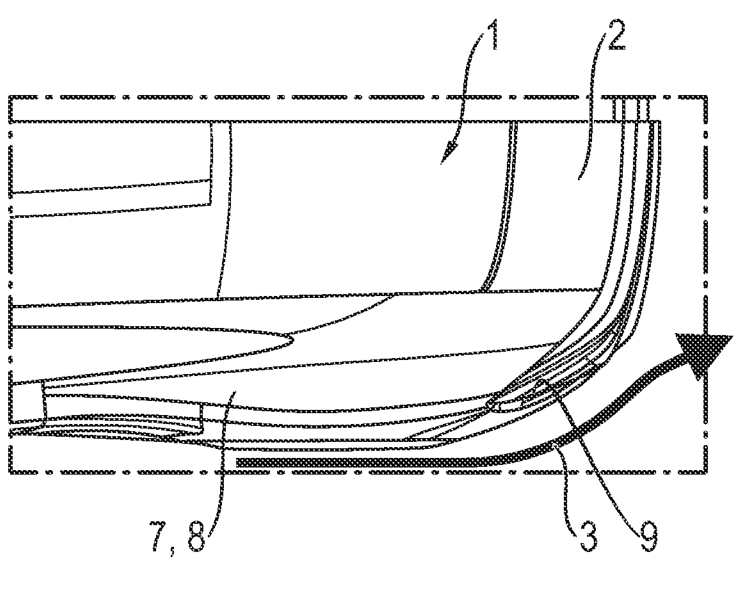
FIG. 1 is a schematic perspective illustration of a vehicle rear and the lateral flow around the vehicle rear without the air-guiding element deployed.
Figure 2:
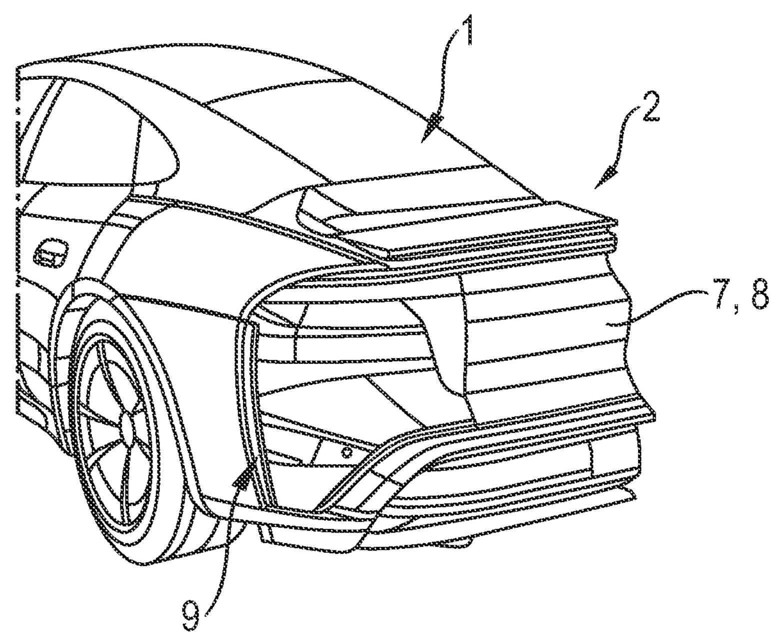
FIG. 2 is another schematic perspective illustration of the vehicle rear as shown in FIG. 1 without the air-guiding element deployed.

FIGS. 1 and 2 show a side of a vehicle rear 2 of a motor vehicle 1 without an air-guiding element, wherein the lateral flow around the vehicle rear 2 when traveling in forward direction is indicated in FIG. 1 by the arrow 3. It can be seen that the air flowing laterally past the motor vehicle 1 flows inward behind the vehicle rear 2 and thus increases the air resistance.

Figure 3:
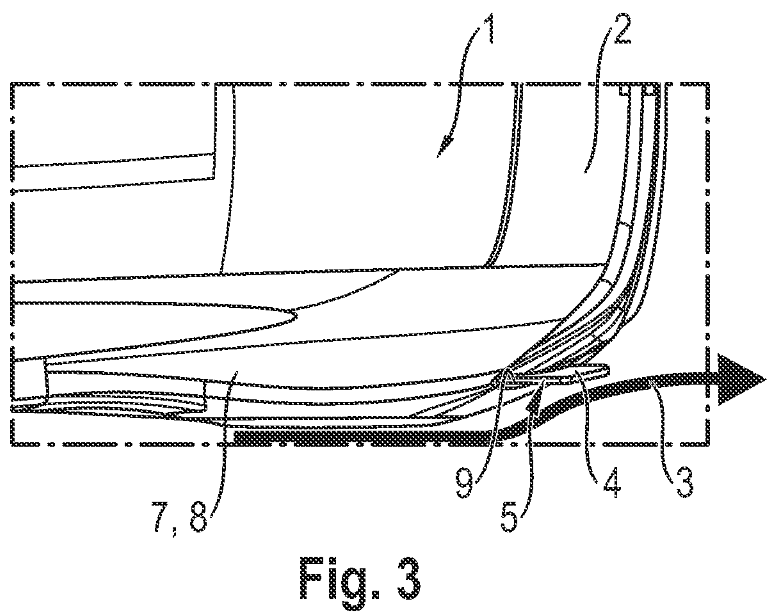
FIG. 3 is a schematic perspective illustration of a vehicle rear and the lateral flow around the vehicle rear with a deployed surface element according to aspects of the invention of an air-guiding element.
Figure 4:
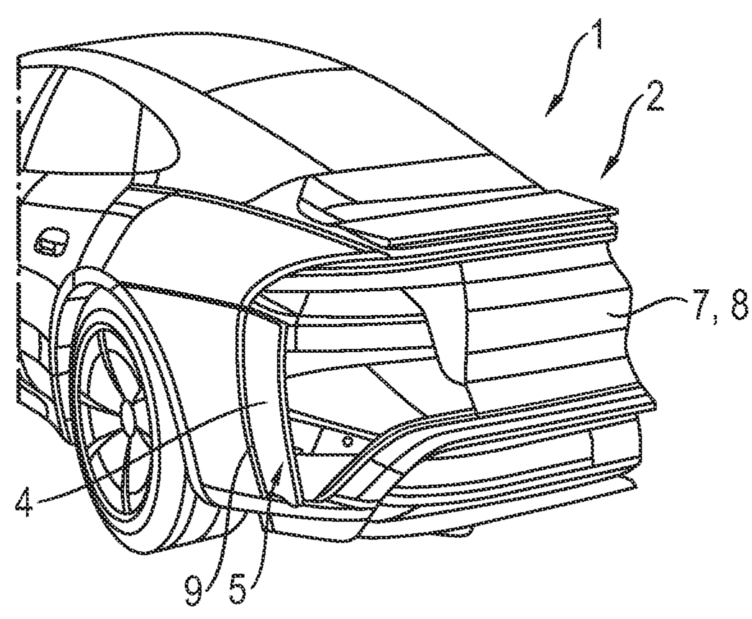
FIG. 4 is another schematic perspective illustration of the vehicle rear as shown in FIG. 3 with the surface element of the air-guiding element deployed.
Figure 6:
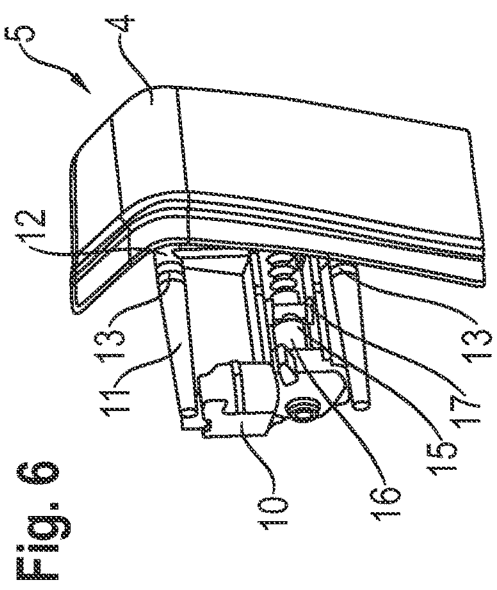
FIG. 6 is a schematic perspective illustration of the air-guiding element according to aspects of the invention with the surface element, the carrier element and the drive element in a retracted operating position.
Figure 8:
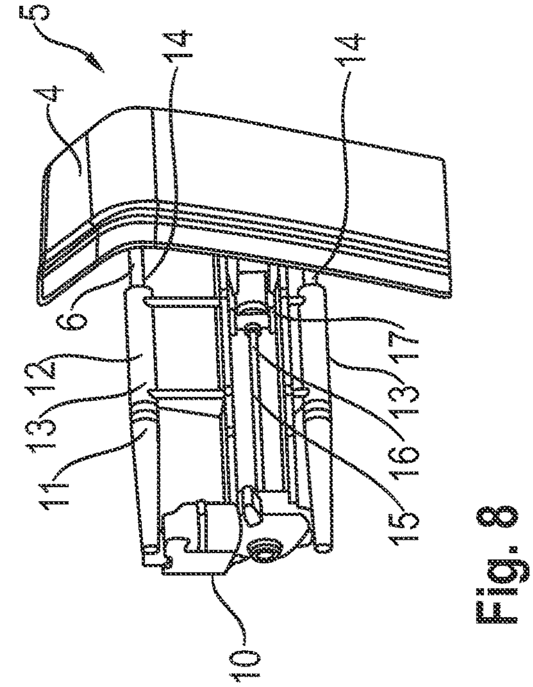
FIG. 8 is a schematic perspective illustration of the air-guiding element according to aspects of the invention with the surface element, the carrier element and the drive element in a deployed operating position.

FIGS. 3 and 4 show a side of a vehicle rear 2 of a motor vehicle 1 with a deployed surface element 4 of an air-guiding element 5, wherein the lateral flow around the vehicle rear 2 when traveling in forward direction is indicated in FIG. 3 by the arrow 3. It can be seen that the air flowing laterally past the motor vehicle 1 is deflected outward behind the vehicle rear 2 by the surface element 4 of the air-guiding element 5, so that the air does not flow as far inward as can be seen in FIG. 1 without the surface element of an air-guiding element, so that the air resistance for the operating state of FIG. 3 is lower than for the operating state as shown in FIG. 1.

According to FIGS. 5 to 8, the surface element 4 is displaceably guided on a carrier element 6 which can be moved by a drive element 10. The surface element 4 is movably disposed in the vehicle rear 2 in a side part 7 or rear part 8, and can be guided out through a narrow opening 9 so that it is positioned in the air flow and can affect the flow around the vehicle rear 2.

FIGS. 6 to 10 show an embodiment example of an air-guiding element 5 according to aspects of the invention with a surface element 4 and a longitudinally displaceable carrier element 6.

The carrier element 6 can be moved by a drive element 10 along a guide using a linear guide 11, wherein the drive element 10 can move the carrier element 6 back and forth between two end positions.

The surface element 4 is immovably articulated on the carrier element 6 so that the surface element 4 is longitudinally displaceable with the carrier element 6.

The linear guide 11 comprises a guide carriage 12 that comprises two guide sleeves 13, which are disposed spaced apart from one another and in which guide pins 14 engage in a longitudinally displaceable manner in order to mount the carrier element 6 relative to the guide carriage 12.

The drive element 10 comprises a spindle mechanism 15, wherein the carrier element 6 can be driven in a longitudinally displaceable manner by means of the spindle mechanism 15. The drive element 10 is connected in a rotationally drivable manner to a threaded spindle 16 of the spindle mechanism 15 and the carrier element 6 comprises a spindle nut 17 of the spindle mechanism 15, which is connected to the carrier element 6. The spindle nut 17 meshes with the threaded spindle 16 and, when the threaded spindle 16 is rotated, the spindle nut 17 moves linearly; see FIGS. 7 and 8. Spindle 16 may be rotated by an electric motor, for example, which may form part of drive element 10.

Figure 5:
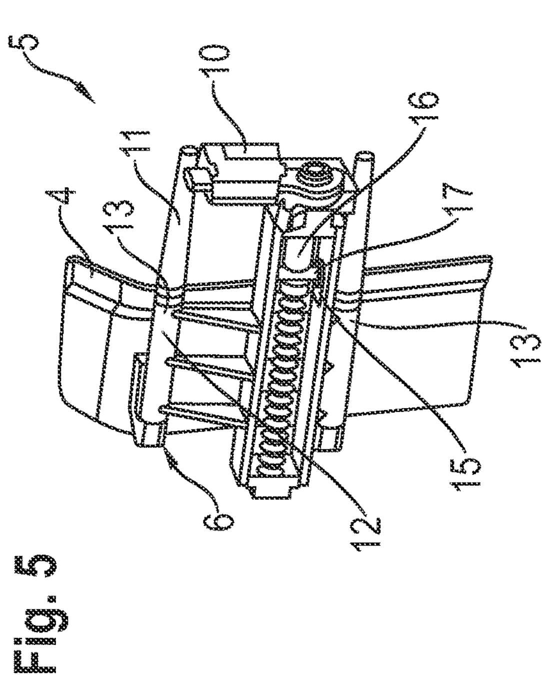
FIG. 5 is a schematic perspective illustration of the air-guiding element according to aspects of the invention with the surface element, the carrier element and the drive element in a retracted operating position.
Figure 7:
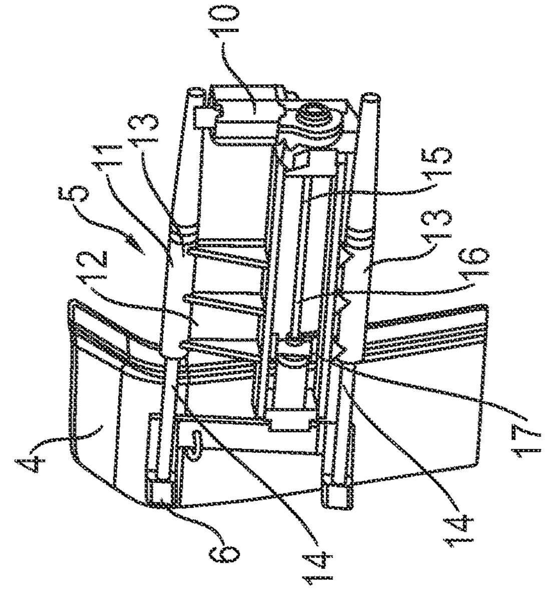
FIG. 7 is a schematic perspective illustration of the air-guiding element according to aspects of the invention with the surface element, the carrier element and the drive element in a deployed operating position.

The carrier element 6 is mounted in a longitudinally displaceable manner in a side part 7 or rear part 8 of a motor vehicle 1, in particular a motor vehicle rear, wherein the surface element 4 is disposed such that it can be moved through an opening 9 of the side part 7 or the rear part 8. In the retracted operating position, the surface element 4 is disposed hidden in the side part 7 or rear part 8 as can be seen in FIGS. 1 and 2, and in the deployed state, the surface element 4 is deployed as can be seen in FIGS. 3 to 5.

The motor vehicle 1 of FIGS. 1 to 4 shows only one surface element 4 on one side of the vehicle rear 2, wherein the air-guiding elements 5 are advantageously disposed in the rear region of the motor vehicle 1 on a side part 7 or rear part 8 on the two oppositely disposed sides of the motor vehicle 1. This applies to both embodiment examples.

In the embodiment example it can also be seen that the at least one surface element 4 of the air-guiding element 5 is generally longitudinally displaceable along a straight, curved or arcuate path. In the figures of the two embodiment examples, it can be seen that the path is arcuate. It can, however, also be straight or configured in some other way.

LIST OF REFERENCE SIGNS

- 1 Motor vehicle
- 2 Vehicle rear
- 3 Arrow
- 4 Surface element
- 5 Air-guiding element
- 6 Carrier element
- 7 Side part
- 8 Rear part
- 9 Opening
- 10 Drive element
- 11 Linear Guide
- 12 Guide Carriage
- 13 Guide sleeve
- 14 Guide Pin
- 15 Spindle mechanism
- 16 Threaded spindle
- 17 Spindle nut

What is claimed is:

1. An air-guiding element for a motor vehicle, said air-guiding element comprising:

a surface element of the motor vehicle, a longitudinally displaceable carrier element, wherein the surface element is articulated on the carrier element in a movably mounted manner, and a drive element including a spindle mechanism and a linear guide for moving the carrier element which results in movement of the surface element, wherein the carrier element is configured to be driven in a longitudinally displaceable manner by the spindle mechanism, wherein the spindle mechanism includes a threaded spindle and a spindle nut that is engaged with the threaded spindle, wherein the spindle nut is in driving connection with the carrier element, wherein the linear guide of the drive element comprises a guide carriage relative to which the carrier element is configured to be displaced, wherein the guide carriage comprises two guide sleeves which are spaced apart from one another and inside of which guide pins of the carrier element engage in a displaceable manner.

2. The air-guiding element according to claim 1, wherein the carrier element is mounted in a longitudinally displaceable manner in either a side part or a rear part of the motor vehicle.

3. The air-guiding element according to claim 2, wherein the surface element is configured to be moved through an opening defined in either the side part or the rear part of the motor vehicle.

4. The air-guiding element according to claim 1, wherein the threaded spindle is rotated by a motor.

5. A motor vehicle comprising at least one air-guiding element of claim 1.

6. The motor vehicle according to claim 5, wherein the motor vehicle comprises two of the air-guiding elements and the air-guiding elements are disposed on two oppositely disposed sides of the motor vehicle.

7. The motor vehicle according to claim 5, wherein the at least one air-guiding element is longitudinally displaceable along a straight, angled, curved or arcuate path.

8. The motor vehicle according to claim 1, wherein the at least one air-guiding element is selectively displaceable in forward and rearward directions of travel of the motor vehicle.

9. The motor vehicle according to claim 5, wherein the carrier element and the spindle mechanism are disposed in a side part or in a rear part of the motor vehicle and the surface element is configured to be moved through an opening of the side part or the rear part.

* * * * *